US011030714B2

(12) United States Patent
Das

(10) Patent No.: US 11,030,714 B2
(45) Date of Patent: Jun. 8, 2021

(54) WIDE KEY HASH TABLE FOR A GRAPHICS PROCESSING UNIT

(71) Applicant: MICROSOFT TECHNOLOGY LICENSING, LLC., Redmond, WA (US)

(72) Inventor: Ritwik Das, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 183 days.

(21) Appl. No.: 15/881,727

(22) Filed: Jan. 27, 2018

(65) Prior Publication Data

US 2019/0236752 A1 Aug. 1, 2019

(51) Int. Cl.
| | |
|---|---|
| G06T 1/60 | (2006.01) |
| G06F 16/00 | (2019.01) |
| G06F 12/1009 | (2016.01) |
| G06F 15/80 | (2006.01) |
| G06T 1/20 | (2006.01) |

(52) U.S. Cl.
CPC ............ G06T 1/60 (2013.01); G06F 16/00 (2019.01); *G06F 12/1009* (2013.01); *G06F 15/8007* (2013.01); *G06F 2212/651* (2013.01); *G06T 1/20* (2013.01); *G06T 2210/52* (2013.01)

(58) Field of Classification Search
CPC ............... G06F 12/1009; G06F 16/00; G06F 2212/651; G06T 1/60
See application file for complete search history.

(56) References Cited

U.S. PATENT DOCUMENTS

| | | | |
|---|---|---|---|
| 6,782,382 B2 * | 8/2004 | Lunteren | G06F 16/90344 |
| 7,248,691 B1 | 7/2007 | Pandit et al. | |
| 7,296,139 B1 * | 11/2007 | Case | G06F 12/0897 |
| | | | 710/26 |
| 8,572,140 B1 | 10/2013 | Mittal | |
| 8,838,558 B2 | 9/2014 | Luk | |
| 9,979,648 B1 * | 5/2018 | Singh | H04L 45/7453 |
| 10,127,270 B1 * | 11/2018 | Evenson | G06F 16/2379 |
| 10,424,097 B2 * | 9/2019 | Vembar | G06T 11/60 |
| 2004/0236720 A1 * | 11/2004 | Basso | H04L 45/00 |
| 2006/0106832 A1 * | 5/2006 | Ben-Dyke | G06F 16/284 |
| 2011/0078427 A1 * | 3/2011 | Shebanow | G06F 9/3851 |
| | | | 712/244 |

(Continued)

OTHER PUBLICATIONS

"International Search Report & Written Opinion Issued in PCT Application No. PCT/US2019/013722", dated Apr. 10, 2019, 13 pages.

(Continued)

*Primary Examiner* — Ming Wu

(57) ABSTRACT

A wide hash key, that exceeds the word size of a GPU memory, is used to perform a key-value mapping by using paired hash tables configured in a multi-level tree configuration. The wide hash key is partitioned into segments, where each segment is used as a key into a respective paired hash table. The paired hash table has one hash table that stores an upper portion of an address and another hash table that stores the lower portion of the address. The upper and lower portions are combined to generate either an address to a paired hash table at the next level in the multi-level tree configuration or the address to the location of the value associated with the wide hash key.

20 Claims, 6 Drawing Sheets

(56) References Cited

U.S. PATENT DOCUMENTS

| | | | | |
|---|---|---|---|---|
| 2011/0145181 | A1* | 6/2011 | Pandya | G06F 16/90344 |
| | | | | 706/27 |
| 2011/0161357 | A1* | 6/2011 | Kataoka | H03M 7/40 |
| | | | | 707/769 |
| 2013/0013890 | A1* | 1/2013 | Manner | A23G 1/0066 |
| | | | | 711/207 |
| 2013/0158770 | A1* | 6/2013 | Araki | B60W 20/19 |
| | | | | 701/22 |
| 2013/0268770 | A1 | 10/2013 | Hunt et al. | |
| 2014/0188893 | A1* | 7/2014 | Kobayashi | G06F 16/9014 |
| | | | | 707/747 |
| 2014/0333635 | A1 | 11/2014 | Demouth | |
| 2015/0286639 | A1 | 10/2015 | Bordawekar | |

OTHER PUBLICATIONS

Mak, et al., "CUDA Data-Parallel Primitives Library", Retrieved From: http://cudpp.github.io/cudpp/2.3/, Retrieved Date: Aug. 21, 2017, 4 Pages.

"Overview of CUDPP hash tables", Retrieved From: http://cudpp.github.io/cudpp/2.3/hash_overview.html#hash_space_limitations, Retrieved Date: Aug. 21, 2017, 2 Pages.

Bordawekar, Rajesh, "Evaluation of Parallel Hashing Techniques", http://on-demand.gputechconf.com/gtc/2014/presentations/S4507-evaluation-of-parallel-hashing-techniques.pdf, Retrieved on: Jan. 26, 2018, 27 pages.

Alcantara, Dan Anthony Feliciano, "Efficient Hash Tables on the GPU", http://idav.ucdavis.edu/~dfalcant//downloads/dissertation.pdf, Retrieved on: Jan. 26, 2018, 133 pages.

Karnagel, Tomas et al., "Optimizing GPU-accelerated Group-by and Aggregation",http://www.adms-conf.org/2015/gpu-optimizer-camera-ready.pdf, Retrieved on: Jan. 26, 2018, 12 pages.

Alcantara, Dan A. et al., "Real-Time Parallel Hashing on the GPU", http://idav.ucdavis.edu/~dfalcant/downloads/hashgpu_sigasia_final.pdf, Retrieved on: Jan. 26, 2018, 9 pages.

Ashkiani, Saman et al., "GPU LSM: A Dynamic Dictionary Data Structure for the GPU", https://arxiv.org/abs/1707.05354, Retrieved on: Jan. 26, 2018, 11 pages.

Kaldewey, Tim et al., Let your GPU do the heavy lifting in your data Warehouse, http://on-demand.gputechconf.com/gtc/2013/presentations/S3190-GPU-Heavy-Lifting-Data-Warehouse.pdf, Retrieved on: Jan. 26, 2018, 34 pages.

* cited by examiner

WIDE KEY HASH TABLE FOR A GRAPHICS PROCESSING UNIT

BACKGROUND

A Graphics Processing Unit (GPU) is a processor that is specialized for graphics processing. The GPU includes hundreds of independent processing units or cores that can execute thousands of threads in parallel. The GPU is configured for single instruction multiple data (SIMD) parallel processing which is widely used in three-dimensional graphics applications and audio/video processing of multimedia applications.

The highly parallel architecture of the GPU is being applied to non-graphical applications, such as complex SQL database operations, business intelligent applications, machine learning, medical imaging, computational physics, earth systems modeling, astrophysics, and others. These applications typically perform repetitive calculations on large volumes of data which benefit from the parallel processing and fast memory access capabilities of a GPU.

However, the performance advantages of a GPU may not be fully realized for those applications due to the limited capacity of the GPU's memory. The GPU is often packaged onto a single silicon chip where the size of the GPU memory is fixed and cannot be expanded. The GPU does not access system memory so the data used by the GPU has to be copied into the GPU's memory before processing and written back afterwards to the system memory. The capacity of the GPU's memory is limited which effects the manner in which the data in the GPU can be accessed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A wide key hash table is a multi-level tree of paired hash tables that facilitate key-value pair mappings in a GPU. The wide key hash table is accessed with a key whose size is not constrained to the word size of the memory of the GPU. A key-value pair mapping maps a key to a slot in a hash table that has a value associated with the key. In order to accommodate a key with an unbounded size, the key is partitioned into segments with each segment fitting within the word size of the GPU's memory. A key segment is mapped to two values in a paired hash table to form an address of either a paired hash table at the next level in the multi-level tree or an address of the value associated with the original key. A paired hash table includes a first hash table that includes the upper portion of an address and a second hash table that includes the lower portion of the address. The upper and lower portions are combined to form the address of the next paired hash table in next level or the location of the address of the value associated with the original key.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
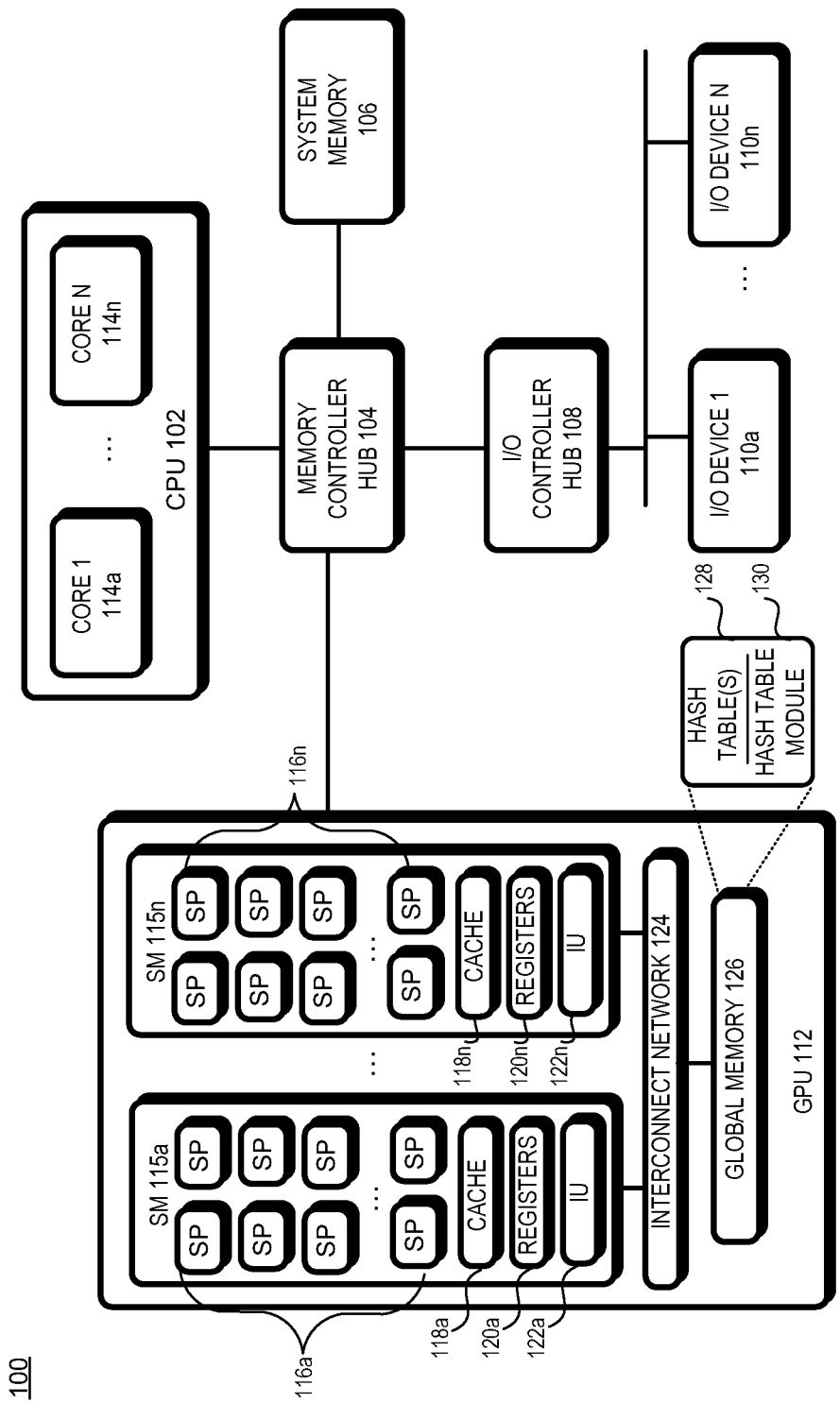
FIG. 1 illustrates an exemplary system that uses the wide key hash table.

The subject matter disclosed pertains to a technique for the fast retrieval and storage of data in the memory of a GPU. The applications which utilize a GPU rely on fast and efficient memory access. A hash table is a data structure that provides fast and efficient random memory access within a constant time $\theta(1)$. A hash table stores key-value pairs. A key-value pair is a set of associated items where the key is used as a unique identifier to a slot of the hash table that contains a value that is associated with the key. The hash table performs a mapping of a key to an associated value.

The size of the hash table key is typically fixed and based on the word size of the GPU's memory. The word size is the length of the address used to access the GPU's memory. Some applications depend on a key that is larger than the word size of the GPU's memory. The techniques described herein overcome this obstacle by segmenting a key into multiple segments, n, where each segment is within the word size of the GPU's memory. In one aspect, the number of segments n is computed as the ratio K/4 rounded up to the nearest integer value, $\lceil K/4 \rceil$, where K is the number of bytes in a key and a segment is 4 bytes.

The mapping of an original key-value pair is performed using a wide key hash table configured as a multi-level tree of paired hash tables. The original key is of an arbitrary size and not restricted to the word size of the GPU's memory. The n segments are used to create a multi-level tree configuration of paired hash tables having n+1 levels. In the case, where n=1, there is a single paired hash table (e.g., where key sizes are smaller than or equal to 32-bits) and in the case where n>1, there are multiple paired hash tables (e.g., where key sizes are larger than 32-bits). A paired hash table includes an upper hash table and a lower hash table. The upper hash table contains the upper portion of an address and the lower hash table contains the lower portion of the address. The upper portion of the address is combined with the lower portion of the address to produce a complete address.

The paired hash tables are configured into a multi-level tree configuration that includes one root node, zero or more intermediate nodes, and at least one leaf node. The root node represents a paired hash table that is accessed by the first segment of the original key. The intermediate nodes represent paired hash tables that generate addresses of the paired hash tables at the next level that leads to the address of the associated value and the leaf node contains the value associated with the original key. Each of the n segments of the original key is used as an index into a respective paired hash table to obtain the upper and lower portions of an address which is used to locate either another paired hash table used in the mapping or the location of the associated value. In this manner, the paired hash tables in a multi-level tree configuration enable an application to use any size key to perform a key-value mapping without being constrained to the limitations of the GPU's memory.

It should be noted that the structure of a CPU and the structure of the GPU differ significantly which is why one may not be able to utilize hash key techniques applicable for a CPU in a GPU. Programs executed on a CPU are normally executed serially and programs in a GPU are executed in parallel. This encourages GPU applications to exploit massive data parallelism. CPUs has fewer execution units while the GPU has several parallel execution units, higher transistor counts, and faster memory interfaces than a CPU. A GPU is normally packaged onto a single die with its memory embedded therein making memory accesses faster. A CPU uses a system memory that has a larger capacity but which is slower to access. As such, the GPU's memory size is fixed which limits the use of wide hash keys to index into a hash table to perform fast memory accesses. Since GPUs usually come with much less memory capacity than their CPU counterparts, it is important to ensure a high load factor so that the GPU memory space is not wasted. Also, GPU memory operations, such as querying and insertion, leverage data access locality to achieve high performance.

Attention now turns for a more detailed description of a system that facilitates the use of a wide key hash table in a GPU.

System Utilizing a Wide Key Hash Table in a GPU

FIG. 1 illustrates an exemplary system 100 configured to utilize a wide key hash table in a GPU. The system 100 includes a central processing unit (CPU) 102, a memory controller hub 104, system memory 106, an input output (I/O) controller hub 108, one or more I/O devices 110a-110n, and a GPU 112. The CPU 102 has one or more cores 114a-114n where each core 114a-114n is an independent processing unit. The CPU 102 is connected to a memory controller hub 104 that is in communication with the system memory 106, the I/O controller hub 108, and the GPU 112 via one or more buses. The memory controller hub 104 controls the flow of data between the CPU 102, system memory 106, and the I/O controller hub 108, and GPU 112. The system memory 106 is used by the CPU to temporarily store programs and data currently being used. The I/O controller hub 108 controls the flow of data between the CPU 102, system memory 106, the GPU 112 and the I/O devices 110a-110n.

The GPU 112 includes one or more streaming microprocessors (SM) 115a-115n that are configured to support SIMD parallelism. Each SM 115a-115n includes multiple processing units (SP) 116a-116n that execute in parallel. A SM 115a-115n also includes one or more cache memories (cache) 118a-118n, multiple registers 120a-120n and one or more instructions units (IU) which operate in concert with the SPs to execute multiple threads of execution concurrently. A SM 115a-115n also includes an interconnect network 124 that connects each of the SMs with a global memory 126.

In the global memory of the SM 126, there are multiple paired hash tables 128 and a hash table module 130. The paired hash tables 128 store the key-value pairs used by a thread running in a SM. The hash table module 130 includes executable instructions that configure the paired hash tables 128 into the multi-level tree configuration, insert key value pairs into a paired hash table 128, and access the paired hash tables 128 to perform the key-value mapping.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention.

Figure 2:
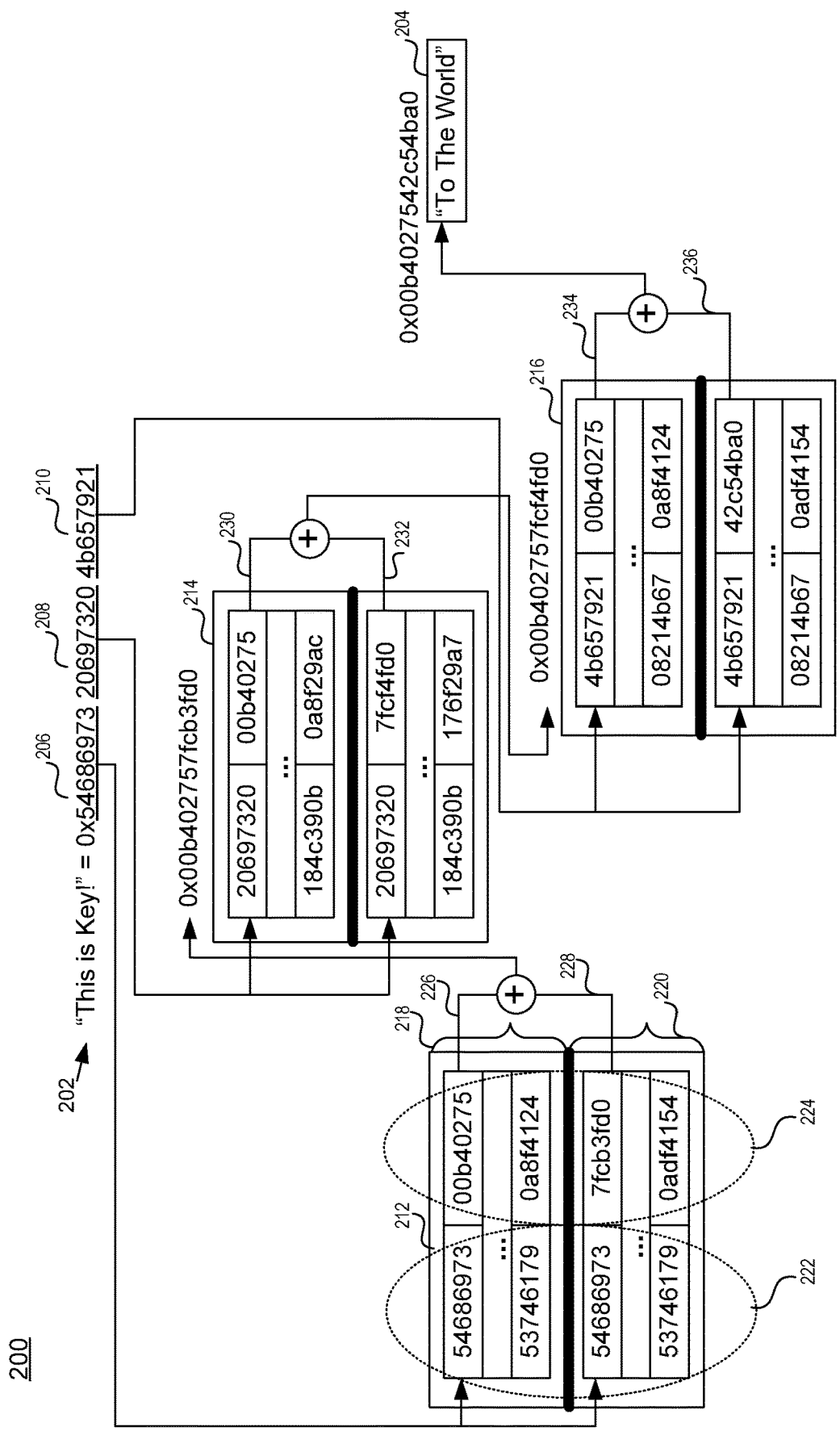
FIG. 2 is a first exemplary diagram illustrating a key-value mapping using a wide key hash table.

Attention now turns to FIG. 2 which illustrates the use of an exemplary wide key hash table used in a key-value mapping 200 in one aspect of the disclosure. In this aspect, the multi-level paired hash tables are used to facilitate a string-to-string mapping. It should be noted that the techniques described herein are not limited to a string-to-string mapping and that the techniques can be used on any type of mapping.

In the example shown in FIG. 2, the string, "This is Key!", 202, is used as a key that maps to a value which is a second string, "To the World" 204. In this example, the key is 12 bytes and the word size of the GPU's memory is 4 bytes. Since the key 202 is larger than the word size of the GPU's memory, the key-value mapping uses a sequence of paired hash tables in a multi-level tree configuration to map the 12-byte key to the location of the value 204.

The key 202 is divided into n segments 206, 208, 210 where each segment acts as an index into a paired hash table that maps a segment into an address. Each segment is associated with a different paired hash table and the address of the paired hash table is computed from the values associated with a segment from a paired hash table in a preceding level in the multi-level tree configuration. A 12-byte key has three sequential key-value mappings to generate the address of the location of the targeted value. The paired hash tables map a key segment to an address.

As shown in FIG. 2, the characters in the key are transformed into a hexadecimal representation. The hexadecimal representation of the character string "This is Key!" is 0x54686973206973204b657921 which is composed of 12 bytes. The key 202 is then converted into n segments 206, 208, 210 where each segment is composed of K/4 bytes. In this example, n=12/4=3 and the 3 segments are 54686973, 20697320, and 4b657921. Each segment is used as a key into a respective paired hash table whose corresponding value is used as an address. Each paired hash table includes an upper hash table and a lower hash table with the upper hash table including the upper portion of an address that corresponds to the key segment and the lower hash table including a lower portion of the address that corresponds to the key segment. The upper portion and the lower portion are combined to form the address of another paired hash table in the next level of the multi-level tree configuration.

As shown in FIG. 2, there are three paired hash tables, 212, 214, and 216. Paired hash table 212 has an upper hash table 218 and a lower hash table 220. Paired hash table 212 contains keys 222 and associated values 224. Paired hash tables 214 and 216 are constructed in a similar fashion.

The first segment of the key 206 is used to index the paired hash table 212 at the first level of the multi-level tree configuration or the root node. The value in the upper hash table 226 and the value in the lower hash table 228 are combined to form the address of a second paired hash table 214 which is at the next level of the multi-tree configuration. The second segment of the key 208 is used to index the second hash table 214. The values matching the second segment of the key in the upper hash table 230 and in the lower hash table 232 are combined to form the address of a third paired hash table 216. The third segment of the key 210 is used to index the third paired hash table 216 which is at the next level in the multi-tree configuration. The value in the upper hash table 234 and the value in the lower hash table 236 are combined to form the address of the location of the value of the original key 202.

Figure 3:
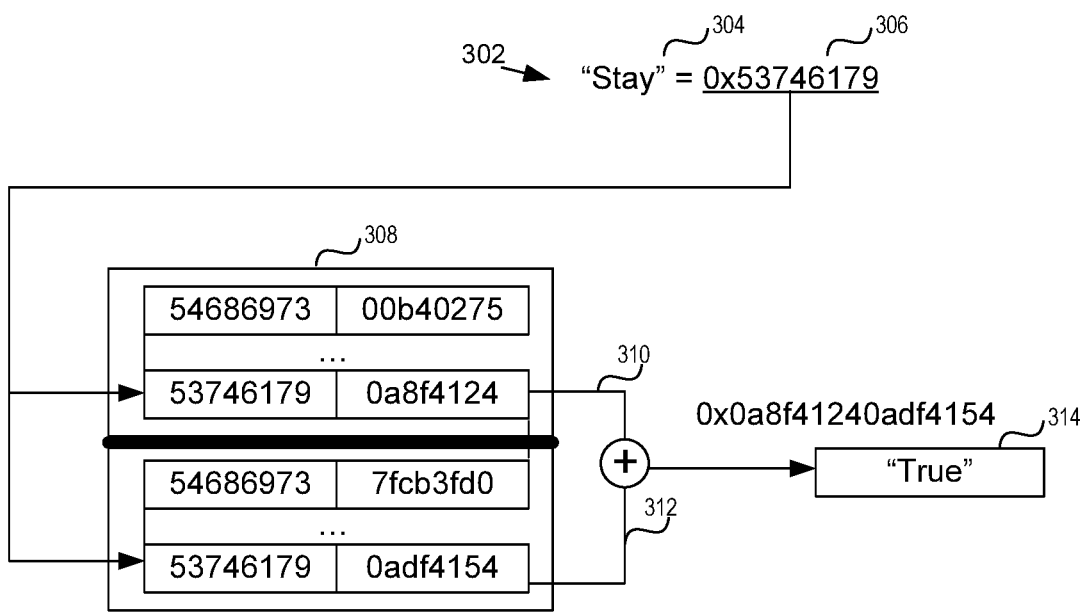
FIG. 3 is a second exemplary diagram illustrating a key-value mapping using a wide key hash table having a single paired hash table.

FIG. 3 illustrates another example of the use of the wide key hash table where the key size is the same as the word size of the GPU's memory. This example shows how the technique described herein can accommodate any size key including those keys that are within the GPU's memory size. In this example, the key is 4 bytes and the word size of the GPU's memory is 4 bytes. The key 302, is a string of characters, "Stay" 304 which is converted into the hexadecimal representation 306, 0x53746179. Since the key does not exceed the word size of the GPU's memory (K/4=1), the key is not partitioned into segments. Instead, the key is used as the index into hash table 308 to obtain the values in the upper hash table 310 and in the lower hash table 312 which are combined to form the address of the location of the value 0x0a8f4120adf4154 which is the string "True" 314.

Figure 4:
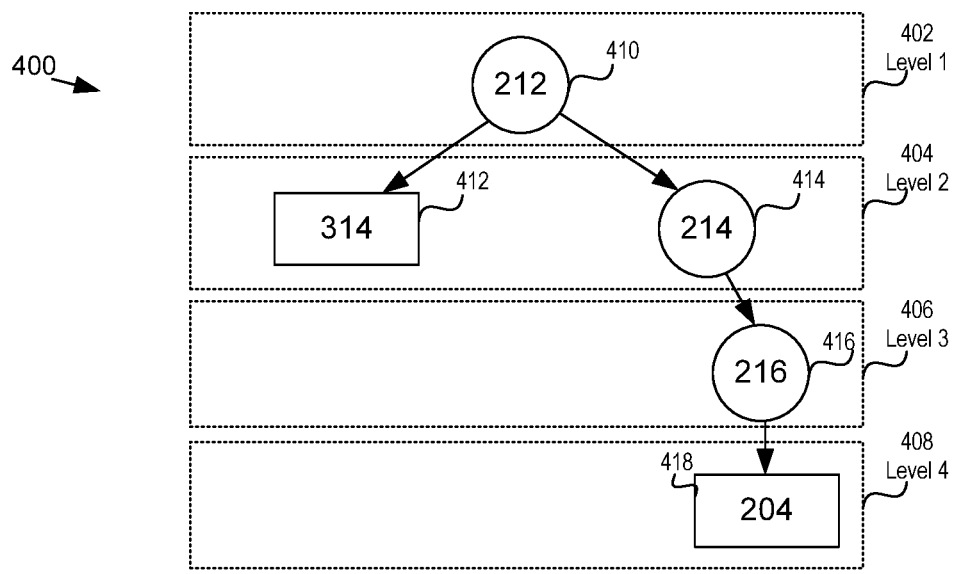
FIG. 4 is a block diagram illustrating the multi-level tree configuration of the wide key hash table shown in FIGS. 2 and 3.

FIG. 4 is a schematic diagram illustrating the multi-level tree configuration 400 of the paired hash tables shown in FIGS. 2 and 3. There are four levels in the multi-level tree configuration 400 shown in FIG. 4. At the first level 402 (level 1), there is a root node 410 that corresponds to the paired hash table 212 shown in FIG. 2. At the second level 404 (level 2), there is a leaf node 412 and an intermediate node 414. The leaf node 412 corresponds to the location of the associated value "True" for the key "Stay" shown in FIG. 3 as node 314. The intermediate node 414 represents paired hash table 214 shown in FIG. 2. At the third level 406 (level 3), there is an intermediate node 416 which represents paired hash table 216 in FIG. 2. At the fourth level 408 (level 4), there is the leaf node 418 which represents the location 204 of the associated value "To the World" that corresponds to the key "This is Key!".

Methods

Attention now turns to descriptions of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5:
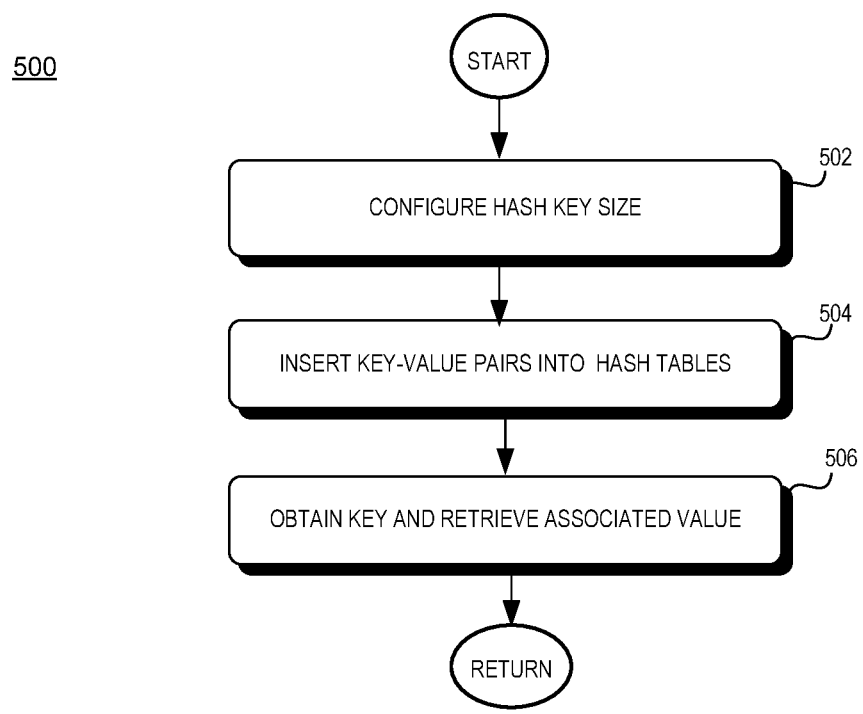
FIG. 5 is a block diagram illustrating an exemplary method of the operations of the wide key hash table.

Turning to FIG. 5, there is shown an exemplary method 500 for configuring a system to utilize the wide hash keys. Initially, the hash table module 130 configures the wide key hash table 128 to accommodate the largest key that may be used by an application executing on the GPU. The maximum size of a key is determined and set for the lifetime of the wide key hash table (block 502). The largest key size is then used to calculate the maximum number of levels needed in the multi-level tree configuration of the paired hash tables. The maximum number of levels is n+1 where n is K/4, where K is the largest expected key size. The hash table module 130 may be provided with an optional hint about the upper bound on an expected number of entries that the wide key hash table may hold which may be used to optimize the memory consumption of the wide key hash table.

In one aspect, the maximum space consumed by the wide key hash table with a GPU memory that has a 64-bit word size for a key size of K bytes with N elements is as follows:

$$16*(1+N*(Ceiling(K/4)-2))*(M+101)+ \\ (N*Space\_Hash(1,P,M)) bytes,$$

where, Ceiling(x) is the smallest integer larger than x,

Space_Hash(n, p, m) is the maximum space required for the underlying hash table which can hold a maximum of n key-value pairs with p being the maximum number of unique keys and m being the space multiplier or the load factor, P is the number of unique keys in the input, and M is the space multiplier.

A tree is a data structure that is composed of nodes and edges without any cycles. A non-empty tree consists of a root node and one or more additional levels that form a hierarchy. A node may have zero or more child nodes which are below it in the hierarchy. A child node has at least one parent node that is above it in the hierarchy. In one aspect, the multi-level tree configuration may be represented as a B-tree where each node has zero or more child nodes. There are various traversal techniques that can be used to traverse such a tree, such as depth-first search and breadth-first search.

There is a maximum of one root node in the wide key hash table for a key size of K bytes and N elements. The maximum number of internal nodes for a key size of K bytes and N elements is N*(Ceiling (K/4)-2). The maximum number of leaf nodes for a key size of K bytes and N elements is N.

The construction of the wide key hash table occurs when the key-value pairs are inserted into the multi-level hash tables (block 504). The multi-level tree is traversed starting at the root node to find in the paired hash table of the root node, a slot having a key that matches the first segment of a requested key. If a match is found, either an address to a memory location containing the associated value is inserted into the slot (e.g., n=1) or a child node is created. The child node includes a paired hash table and the address of the paired hash table is inserted into the slot of the root node.

If there is no match for the requested key in the paired hash table in the root node, a slot is created and the key is inserted into the new slot. If there is one key segment (e.g., n=1), the value inserted into the slot is the address of the memory location containing the associated value. If there are multiple key segments, a child node is created that includes a new paired hash table and the address of the new paired hash table is inserted into the root node. This process repeats until each key segment is inserted into the multi-level tree (collectively, block 504).

During the execution of a program in the GPU, the hash table module 130 may receive a request to obtain the value associated with a key. The hash table module 130 performs a key-value pair mapping to retrieve the value associated with the key (block 506) which is described in more detail in FIG. 6.

Figure 6:
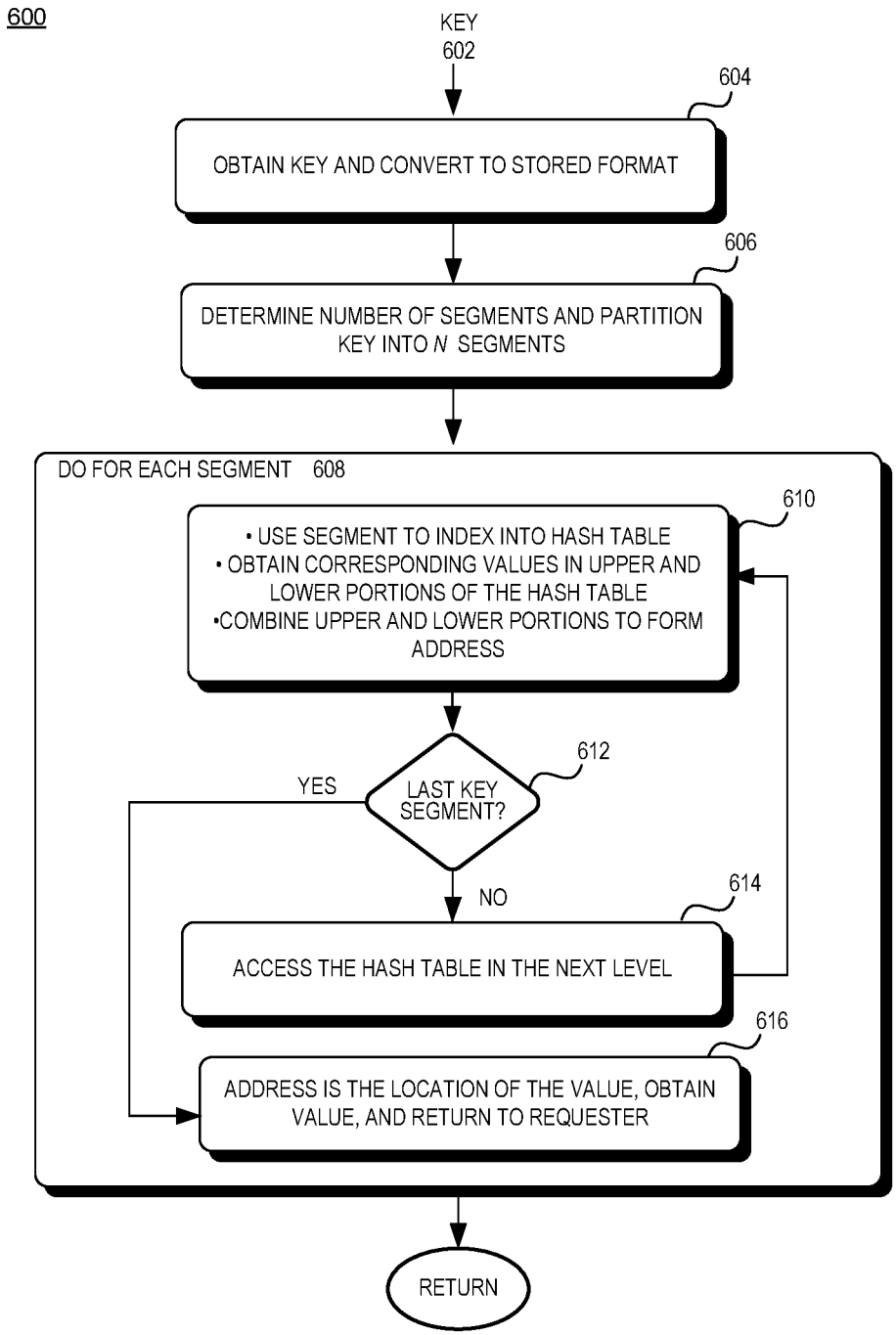
FIG. 6 is a block diagram illustrating an exemplary method of the operations of a GPU to access a key-value from the wide key hash table.
Figure 7:
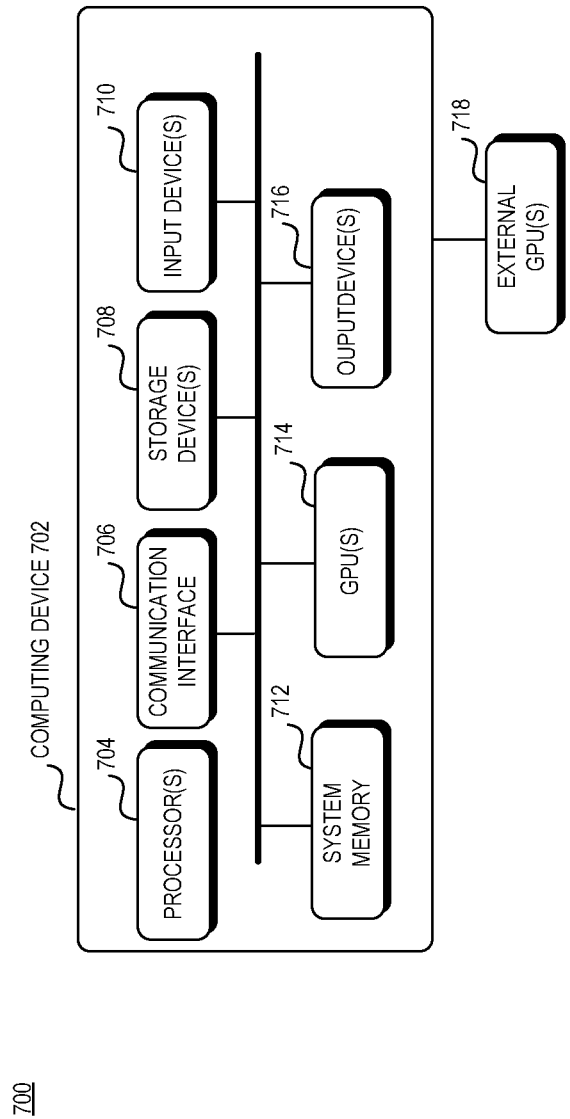
FIG. 7 is a block diagram illustrating an exemplary computing or operating environment.

FIG. 6 illustrates an exemplary method 600 for performing a key-value mapping using the paired hash tables. A processing unit in the GPU will receive a request to obtain a value associated with a key 602 (block 604). The hash table module 130 processes the request by converting the key into the format that is used to store the key in memory (block 604). For example, the key made be composed of characters which are converted into a corresponding hexadecimal representation. The hash table module 130 partitions the key into n segments as described above (block 606).

Each segment is then used as an index into a respective paired hash table (block 608). The first segment is used to index a root hash table in both the upper and lower hash tables. The values obtained in the upper and lower hash tables of the root hash table are combined to form an address (block 610). If the segment is the last key segment (block 612—yes), then the address is to the location of the value, the value is obtained and returned to the requesting thread (block 616). If the segment is not the last segment (block 612—no), then the address is to a paired hash table in the next level (block 614). The paired hash table of the next level is accessed and the process repeats until the target value is retrieved (blocks 614-616).

Operating Environment

Attention now turns to a discussion of an exemplary operating environment. It should be noted that the operating environment 700 is exemplary and is not intended to suggest any limitation as to the functionality of the embodiments. The embodiments may be applied to an operating environment 700 utilizing at least one computing device 702. The computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

The computing device 702 may include one or more processors 704, a communication interface 706, one or more storage devices 708, one or more input devices 710, a system memory 712, one or more GPUs 714, and one or more output devices 716. A processor 704 may be any commercially available processor and may include dual microprocessors and multi-processor architectures. The communication interface 706 facilitates wired or wireless communications between the computing device 702 and other devices. The storage devices 708 may be computer-readable medium that does not contain propagating signals, such as modulated data signals transmitted through a carrier wave. Examples of the storage devices 708 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. The input devices 710 may include a keyboard, mouse, pen, voice input device, touch input device, etc., and any combination thereof. The output devices 716 may include a display, speakers, printers, etc., and any combination thereof.

The system memory 712 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 714 may also include one or more external storage devices or remotely located storage devices that do not pertain to propagated signals, such as modulated data signals transmitted through a carrier wave. The system memory 714 may contain instructions, components, and data.

The GPU 714 may be any commercially available GPU such as, without limitation, a general purpose GPU (GPGPU), the AMD Accelerated Processing Unit, the Intel HD and Iris Graphics products, ATI Radeon products, Nvidia GeForce® products, and the like. The GPU may be located on a graphics or video card, in a plug-in card, on a chipset on a motherboard, or in the same chip as the CPU. It should be noted that the technology described herein is not limited to any particular GPU product or manner in which the GPU is position into a computing device. The GPU may be an external GPU 718 that is part of an external graphics card that is connected to the computing device 702. The technology described herein is not limited in this manner.

Technical Effect

Aspects of the subject matter disclosed herein pertain to the technical problem of performing key-value pair mappings in a GPU with a key of an unbounded size. The technical feature associated with addressing this problem is the use of a wide key hash table. A wide key hash table is a multi-level tree of paired hash tables. The tree is used to facilitate a mapping with keys that are within the word size of the GPU's memory. The mapping forms n+1 addresses to obtain the location of the value associated with a requested key, where n is based on the size of the unbounded key. In this manner, the key-value pair mapping can be performed without restriction on the size of a key and the word size of the GPU's memory.

In accordance with aspects of the subject matter described herein, a system can include a GPU having a plurality of processors in communication with a memory. The GPU includes one or more paired hash tables configured in a multi-level tree configuration where a paired hash table has an upper portion and a lower portion. The upper portion of the paired hash table includes a key and a value and the value of the upper portion of the paired hash table represents a first portion of an address corresponding to the key of the upper portion. The lower portion of the paired hash table includes the key and a value where the value of the lower portion of the paired hash table represents a second portion of an address corresponding to the key of the lower portion.

The GPU includes a first module including instructions that when executed on the GPU performs a key-value mapping using the one or more paired hash tables to access a value associated with a key, wherein the key is of any size. The first module includes further instructions that when executed on the GPU partitions the key into n segments, wherein a segment is within the word size of the memory of the GPU, wherein n is set to K/4 and K is the number of bytes in a key. The first module obtains a value associated with the key by performing n sequential key-value mappings to obtain an address of a location of a value associated with the key, where n is set to K/4, where K is the number of bytes in a key.

The multi-level tree configuration includes n+1 levels, where n is based on the number of key segments of the key that fit within a word size of the memory of the GPU. The n sequential key-value mappings utilize the multi-level tree configuration of the n+1 paired hash tables to obtain a location of the value associated with the key, where a segment is used as a key into a respective paired hash table whose associated value provides an address to a location of a paired hash table in a next level of the multi-level tree configuration. In some aspects, the key exceeds a word size of the memory of the GPU. The key-value mappings can be used to convert use a first string to map to a second string that differs from the first string.

In accordance with aspects of the subject matter described herein, a device includes a GPU including at least one processing element and a memory, where the memory is configured to store data such as a multi-level tree. The memory has a word size. The multi-level tree includes one or more paired hash tables at each level. A paired hash table includes a first hash table that has a first portion of an address and a second hash table that has a second portion of the address. At least one processing element is configured to perform a key-value mapping using the multi-level tree of paired hash tables to obtain an address of a location of a value associated with an original key and obtain the value associated with the original key from the key-value mapping. The original key may exceed the word size of the memory.

The original key may be partitioned into n segments, where n is set to K/4, where K is the number of bytes in the original key. The multi-level paired hash table may include n+1 levels. Each key segment is used to index a respective paired hash table to obtain a next address where the next address associated with a location of a paired hash table at a next level or a location of the value associated with the original key. The values from each hash table in the paired hash table are combined to form the next address. The multi-level tree contains a root node having a first paired hash table and zero or more child nodes, a child node having a second paired hash table that is accessed by values stored in the first paired hash table.

A method utilizing the device and/or system described herein may receive an original key associated with an original value, partition the original key into n segments, use each of the n segments to retrieve values stored in a wide key hash table, obtain a location of the original value associated with the original key from the values stored in the wide key hash table, and retrieve the original value. The wide key hash table includes a plurality of hash tables in a multi-level tree configuration. A segment is within a word size of a graphics processing unit (GPU) memory. The method may further determine a size of a segment as K/4, where K is a number of bytes in the original key, configure the wide key hash table with n+1 levels, where n is K/4 and K is a number of bytes in the original key, use a segment as a key to retrieve an associated value in a paired hash table at a first level to obtain an address to a paired hash table at a next level, and/or use a segment as a key to retrieve an associated value in a paired hash table at a first level to obtain an address of a location of the original value associated with the original key.

A paired hash table includes a first hash table and a second hash table. The first hash table includes an upper portion of an address and the second hash table includes a lower portion of the address. The upper portion of the address is combined with the lower portion of the address to generate a location of the original value or a location of a paired hash table in the next level.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It should be noted that the techniques described herein can be varied in several respects. For example, the construction of the hash tables is not limited to paired hash tables, where one hash table of the pair contains an upper portion of an address and another hash table of the pair contains the lower portion of an address. There can be m hash tables combined to include m portions of an address.

Additionally, the techniques described herein are not limited to keys whose size is the same or larger than the word size of the GPU's memory. In those cases where the key is less than the word size of the GPU's memory, the key can be padded with leading and/or trailing zeroes to attain the target size.

What is claimed:

1. A system comprising:
a graphics processing unit (GPU) having a plurality of processors in communication with a memory, wherein the GPU includes one or more paired hash tables configured in a multi-level tree configuration, a paired hash table having an upper portion and a lower portion, the upper portion and the lower portion indexed by a same key to two distinct entries of the paired hash table, the upper portion of the paired hash table including a first portion of an address, the lower portion of the paired hash table including a second portion of the address,
wherein the GPU includes a first module including instructions that when executed on the GPU performs a key-value mapping using the one or more paired hash tables to access an original value associated with a wide hash key that exceeds a word size of the GPU memory.

2. The system of claim 1, wherein the multi-level tree configuration includes n+1 levels, where n is based on a number of key segments of the wide hash key that fit within a word size of the GPU memory.

3. The system of claim 1, wherein the first module includes further instructions that when executed on the GPU partitions the wide hash key into n segments, wherein a segment is within the word size of the GPU memory, wherein n is set to K/4 and K is a number of bytes in the wide hash key.

4. The system of claim 1, wherein the first module obtains a value associated with the wide hash key by performing n sequential key-value mappings to obtain an address of a location of the original value associated with the wide hash key, where n is set K/4, where K is a number of bytes in the wide hash key.

5. The system of claim 4, wherein the n sequential key-value mappings utilize a multi-level tree configuration of n+1 paired hash tables to obtain a location of the original value associated with the wide hash key, wherein a segment is used as a key into a respective paired hash table whose associated value provides an address to a location of a paired hash table in a next level of the multi-level tree configuration.

6. The system of claim 1, wherein combination of the first portion of the address and the second portion of the address represents a location of a second paired hash table or a location of the original value associated with the wide hash key.

7. The system of claim 1, wherein the key-value mappings use a first string to map to a second string that differs from the first string.

8. A computer-implemented method, comprising:
receiving an original key associated with an original value;
partitioning the original key into n segments, wherein a segment is within a word size of a graphics processing unit (GPU) memory, wherein the original key exceeds the word size of the GPU memory;
using each of the n segments to retrieve values stored in a wide key hash table, the wide key hash table including a plurality of paired hash tables in a multi-level tree configuration, a paired hash table having an upper portion and a lower portion, wherein a segment is mapped to a first value stored in the upper portion and the segment is mapped to a second value in the lower portion wherein the upper portion and the lower portion are indexed by a same key to two distinct entries of the paired hash table;
obtaining a location of the original value associated with the original key from the first value and the second value; and
retrieving the original value.

9. The method of claim 8, further comprising:
determining a size of a segment as K/4, where K is a number of bytes in the original key.

10. The method of claim 8, further comprising:
configuring the wide key hash table with n+1 levels, where n is K/4 and K is a number of bytes in the original key.

11. The method of claim 10, further comprising:
using a segment as a key to retrieve an associated value in a paired hash table at a first level to obtain an address to a paired hash table at a next level.

12. The method of claim 10, further comprising:
using a segment as a key to retrieve an associated value in a paired hash table at a first level to obtain an address of a location of the original value associated with the original key.

13. The method of claim 8, wherein the location of the original value is an address composed of the first value and the second value.

14. The method of claim 13, further comprising:
combining the upper portion of the address with the lower portion of the address to generate a location of the original value or a location of a paired hash table in a next level.

15. A device, comprising:
a graphics processing unit (GPU) including at least one processing element and a memory, the memory configured to store data, the memory associated with a word size; and
a multi-level tree including one or more paired hash tables at a level, a paired hash table including a first hash table having a first portion of an address and a second hash table having a second portion of the address;
wherein the at least one processing element is configured to:
perform a key-value mapping using the multi-level tree of the one or more paired hash tables to obtain an address of a location of an original value associated with an original key, wherein the original key exceeds the word size of the memory, wherein the key-value mapping maps a portion of the original key to the first portion of an address in the first hash table and maps the portion of the original key to the second portion of the address in the second hash table, wherein the first hash table and the second hash table are indexed by a same portion of the original key to two separate entries of the first hash table and the second hash table; and
obtain the original value associated with the original key from the key-value mapping.

16. The device of claim 15, wherein the at least one processing element is further configured to:
partition the original key into n segments, where n is set to K/4, where K is the number of bytes in the original key.

17. The device of claim 16, wherein the multi-level paired hash table includes n+1 levels.

18. The device of claim 16, wherein the at least one processing element is further configured to:
use each segment to index a respective paired hash table to obtain a next address, the next address associated with a location of a paired hash table at a next level.

19. The device of claim 18, wherein the at least one processing element is further configured to:
combine a value from the paired hash table to form the next address.

20. The device of claim 16, wherein the multi-level tree contains a root node having a first paired hash table and zero or more child nodes, a child node having a second paired hash table that is accessed by values stored in the first paired hash table.

* * * * *